United States Patent [19]
Cavazos

[11] Patent Number: 4,965,954
[45] Date of Patent: Oct. 30, 1990

[54] FISH GRIPPING APPARATUS

[76] Inventor: Danny F. Cavazos, 3342 Lasses, San Antonio, Tex. 78223

[21] Appl. No.: 356,774

[22] Filed: May 24, 1989

Related U.S. Application Data

[63] Continuation-in-part of Ser. No. 245,119, Sep. 16, 1988, abandoned.

[51] Int. Cl.$^5$ ............................................. B25B 7/02
[52] U.S. Cl. ......................................... 43/4; 81/418; 81/426
[58] Field of Search ................... 43/1, 4, 5, 53.5; 81/186, 418, 419, 420, 424.5, 426, 426.5

[56] References Cited

U.S. PATENT DOCUMENTS

| | | | |
|---|---|---|---|
| 1,151,789 | 8/1915 | Huck | 81/426 |
| 2,551,374 | 5/1951 | Hansen | 81/420 |
| 2,883,750 | 4/1959 | Haas | 81/418 |
| 4,023,450 | 5/1977 | Ygfors | 81/418 |
| 4,559,853 | 12/1985 | Oye | 81/420 |

FOREIGN PATENT DOCUMENTS

| | | | |
|---|---|---|---|
| 1491082 | 3/1969 | Fed. Rep. of Germany | 32/62 |
| 2599937 | 12/1987 | France | 43/53.5 |

*Primary Examiner*—Richard K. Seidel
*Assistant Examiner*—James Miner
*Attorney, Agent, or Firm*—Cox & Smith Incorporated

[57] ABSTRACT

The present invention provides pliers for safely gripping the lower lip of a fish in a manner which protects the fish from harm and enables handling of the fish by tending to compress a pressure point common in many fish and by enabling the mouth of the fish to be propped open for hook removal without direct contact between the fish and the fisherman, the fish gripping pliers having uniquely shaped handles which are secure and comfortable in the hand of the fisherman when in use and having C-shaped upper jaw with a tip which is perpendicular to the lower jaw upon closure and a lower jaw with an engaging surface that progresses toward its tip from a cylindrical portion to a convex forward portion with the tip thereof being rounded for engaging the flesh central to the mandible of the fish without injuring the same.

3 Claims, 2 Drawing Sheets

FISH GRIPPING APPARATUS

CROSS-REFERENCE TO RELATED APPLICATION

The present application is a continuation-in-part application of my co-pending application No. 07/245,119, filed on Sept. 16, 1988 abandoned on Sept. 27, 1989.

BACKGROUND OF THE INVENTION

The present invention relates to pliers and other apparatus for gripping fish and for enabling removal of a fish hook from or other handling of a fish More particularly, the present invention relates to an apparatus for gripping a fish proximate its lower lip in a manner which forces the mouth of the fish open while minimizing transfer of harmful bacteria to the fish and simultaneously paralyzing the fish so that a hook may be easily removed from the fish's mouth or the fish may be inspected or otherwise affected.

The handling of a fish for the purpose of dehooking or inspecting can be harmful to the fish as well as an individual handling the fish. The fish may be harmfully squeezed or dropped, its protective scales and slime may be inadvertently removed, and extended handling outside of its aqueous environment may harmfully affect its breathing functions. Furthermore, many fish are particularly susceptible to bacterial infection caused by contact with the human hand. Consequently, once a fish is taken captive or otherwise handled, the fish's likelihood of surviving is substantially diminished, even when subsequently released.

As a result, both the sportsman and conservationist alike find it advantageous to minimize handling of a fish. A variety of tools, such as "hook-out pliers", have been developed to enable handling of fish in a manner which minimizes harmful contact between fish and humans. More stringent fishing regulations have also been enacted across the nation in order to preserve fish in the wildlife. Such regulations often restrict the type, size and number of fish caught by fishermen. For instance, in Texas, the size of a landed redfish must be between 20 inches and 28 inches or the fish must be released back to the wild. Unfortunately, as previously discussed herein, even when fish are released back to the wild, they often die due to injuries. Fishermen are, therefore, encouraged to exercise extreme care when they catch fish which are not legal or otherwise are not desired. Such care enables the effectiveness of "catch and release" programs designed to preserve fish. Catch and release programs are, in fact, becoming so popular that designation of certain bodies of water as exclusively for catch and release type fishing is planned by some.

Perhaps the most effective and least harmful of grips for handling a fish is the one-handed grip of the fish's mandible, or lower lip. This one-handed lower lip grip has long been popularized by fishing magazines and programs and is achieved by inserting a person's thumb inside the mouth of the fish and gripping the flesh of the floor of the fish's mouth. This flesh, which is central to the fish's lower jaw and is considered part of the mandible, typically includes a mass of tendons and nerves which cause immobilization of many species of fish, including bass and trout, when compressed between the thumb and forefinger. Such a grip not only minimizes the removal of slime and scales from the fish, but also provides beneficial leverage for removing a hook from the mouth of the fish. Those factors and others make the grip one which minimizes harm to a fish during handling.

Unfortunately, gripping a fish's mandible by hand still subjects the fish to bacterial and other contamination from the gripping hand and can be harmful to the hand, particularly due to punctures caused by the fish-hook (which would also be in the proximity of the fish's mandible) and sharp teeth common in certain species of fish, such as trout and mackeral.

U.S. Pat. No. 4,559,853, issued to Oye, discloses a pliers-like tool having a transversely extended, cylindrically-shaped anvil portion and a smaller hammer portion to replace the one-handed lower lip grip. However, even though such pliers help to minimize contact between an individual and the fish, the structure that the pliers utilize to approximate the one-handed lower lip grip risks injury to the fish in several respects. First of all, when the pliers of the Oye patent are utilized to prop open the mouth of a fish, the cylindrical anvil bears against the lower surface of the fish's mandible which is typically curved in the opposite direction. As a result, the support provided by that anvil tends to be concentrated along a line transversely oriented across the mandible and throat of the fish, tending to injuriously stress that flesh when the mouth is propped open. In addition, because the jaws of such pliers are capable of completely closing, the flesh of the fish that is gripped by the pliers can easily be crushed or severed when the pliers are being handled by an excited angler or any other individual who does not realize the fragility of that flesh.

It is, therefore, an object of the present invention to provide an apparatus which enables gripping of a fish while minimizing contact with the fish. Another object is to provide a fish gripping apparatus which is lightweight, easily totable and operable with one hand for enabling use while fishing, especially when wade fishing. It is also an object of the present invention to enable handling of the fish in a manner which optimally preserves its life, including by minimizing the removal of slime and scales from the fish, by minimizing the need to remove the fish from the water upon capture, and by enabling removal of a hook from the mouth of the fish. It is a further object of the present invention to alleviate problems encountered in previous attempts to enable handling of fish and other handled objects. Many other objects and other information pertaining to the present invention will be obvious to one of ordinary skill in the art in light of the foregoing and following descriptions and the appended claims.

SUMMARY OF THE INVENTION

The present invention is primarily directed to facilitate the catch and release programs of preserving fish by minimizing the previously discussed hazards and others encountered by the prior art. It is also directed to many other applications including the handling of fish by conservationists and in fish hatcheries and farms. To accomplish this, the present invention provides plastic pliers which are particularly adapted to grip the flesh central to the mandible of a fish in a manner which approximates, and yet improves upon, the one-handed lower lip grip popular among fishermen.

More particularly, the present invention is embodied in a pair of pliers having a C-shaped upper jaw and an S-shaped lower jaw which is flared at its tip. The handles of the pliers are curved with the upper handle curved to fit comfortably and securely within the palm of a hand and the lower handle bent at its tip to prevent the fingers of that hand from slipping off the lower handle. The upper surface of the lower jaw is convex in the shape of a slender, inverted spoon for minimizing injury to a fish. The lower jaw is also rounded in the region of its tip and extends further from the pivot point of the pliers to enable leverage for upwardly tilting the fish's mandible without injuring the throat of the fish.

These and other particular adaptations of the present invention enable secure gripping of a fish by the flesh central to its mandible and, with many species of fish, tend to paralyze the fish by compressing appropriate pressure points in the flesh central to the mandible. The pliers are such that the flesh may be gripped between the tip of the upper jaw and the spoon-shaped upper surface of the lower jaw of the pliers when the jaws of the pliers are closed upon that flesh. More importantly, though, the pliers do so in a manner which minimizes bacterial transfer and other harm to the fish. The particularities of the lower jaw in complimentary combination with those of the upper jaw also enable a user to hold the fish in a manner which props its mouth wide open so that a hook may be easily removed from the interior of its mouth. Thus, virtually any need for contact between the fish and the fisherman is eliminated and the pliers of the present invention provide a means for minimizing harm not only to a captured fish but also to the individual handling the fish with the aid of the pliers of the present invention.

The pliers of the present invention are also provided with a stop formed integral with its jaws in order to prevent the jaws from crushing the flesh of a fish.

These and other advantages, objects and features of the present invention will become more obvious to those skilled in the art upon reading the following descriptions of the invention, taken in conjunction with the accompanying drawings and appended claims. The foregoing and following descriptions, however, are for exemplary purposes only, and the true spirit and scope of the invention is embodied in the appended claims.

BRIEF DESCRIPTION OF THE DRAWINGS

FIG. 5 shows a second view of the gripping apparatus 10 of the present invention as operatively employed to grip a fish 100 with the use of an individual's hand 110.

DETAILED DESCRIPTION OF THE PREFERRED EMBODIMENT

Figure 4:
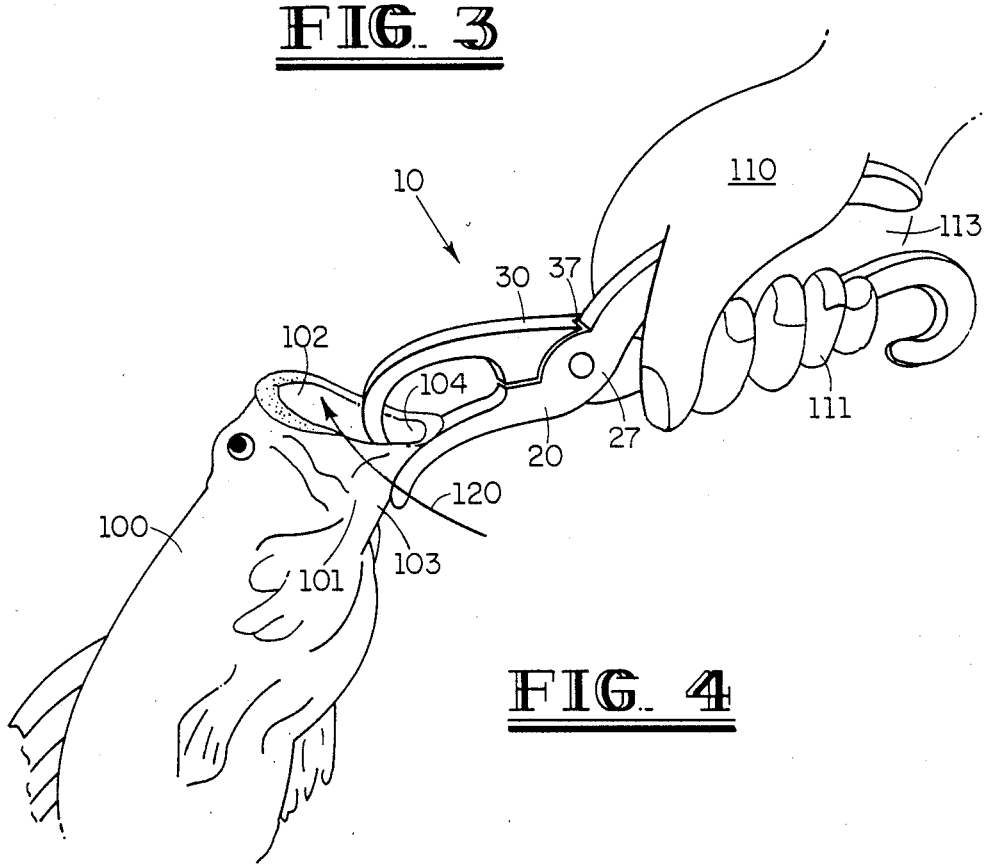
FIG. 4 shows a perspective view of the gripping apparatus 10 of the present invention as operatively employed to grip a fish 100 with the use of an individual's hand 110.

Referring to FIGS. 4 and 5, the present invention is embodied in pliers 10 which are particularly adapted to grip a fish 100 by flesh 105 central to its mandible 101 in a manner which props the mouth 102 of fish 100 wide open and which tends to paralyze fish 100. FIGS. 4 and 5 show pliers 10 operatively employed by the hand 110 of a user of the present invention.

Figure 1:
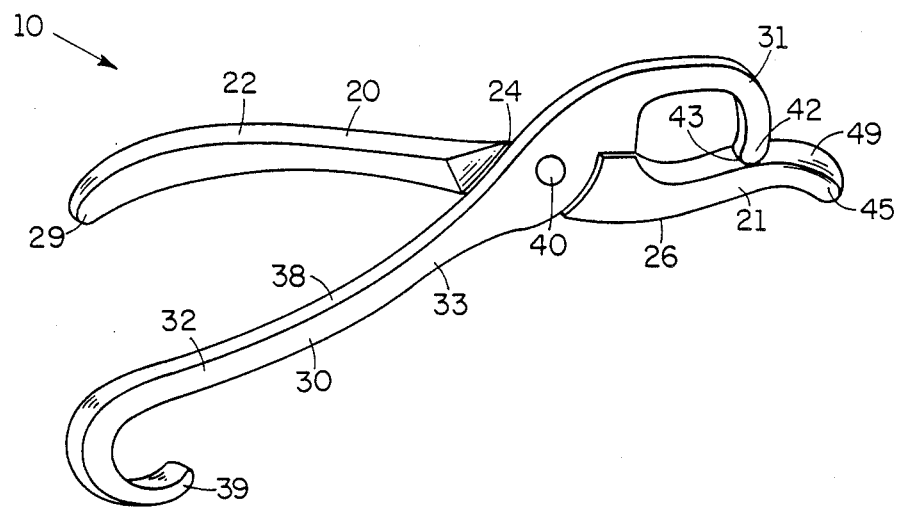
FIG. 1 shows an isometric perspective of the fish gripping apparatus 10 of the present invention, predominately showing the right side of the gripping apparatus.

Referring to FIG. 1, the pliers 10 of the present invention are composed of a plastic material, which causes pliers 10 to float when dropped or otherwise placed in water, and comprise a first member 20 and a second member 30 pivotally connected by pin 40. Each of first member 20 and second member 30 have a jaw (21, 31, respectively) for engaging a gripped object, especially a fish, and a handle (22, 32, respectively). Handles 22 and 32 in operative combination with pin 40 are means for enabling manual closure of jaws 21 and 31 toward one another. Pin 40 is a pivot point for members 20 and 30 and holds members 20 and 30 in operative pivotal, scissor-like relation such as is standard for common pliers.

In reference to the most advantageous of orientations of pliers 10 when operatively employed to grip a fish, certain parts are described as "upper" or "lower". Accordingly, handle 22 is termed the "upper handle" of pliers 10. Handle 32 is termed the "lower handle" of pliers 10. Jaw 31 is termed the "upper jaw" of plier 10 and jaw 21 is termed the "lower jaw" of pliers 10. The surfaces 24 and 33 of members 20 and 30, respectively, are each referred to as a "right surface". Surfaces 23 and 34 (shown in FIG. 2) of members 20 and 30, respectively, are each referred to as a "left surface".

Left surface 23 (shown in FIG. 2) and right surface 33 are substantially planar except near the tip 45 of first member 20 where first member 20 has a broadened and rounded adaptation (described further herein). Member 20 and member 30 are, however, reduced in width at portions 27 and 37 relative to the rest of members 20 and 30, respectively. The reduced width of portions 27 and 37 enables the plier-like construction and operation of pliers 10.

Because pliers 10 are intended for use in an often aqueous and frequently slimy environment, and because fish 100 may be lively and difficult to grip, upper handle 22 and lower handle 33 are particularly adapted to enhance their grippability during use. Referring to both FIG. 2 and FIG. 4, the shape of upper-handle 22 and lower-handle 32 are basically similar to those of conventional pliers in that their facing surfaces 28 and 38, respectively, are generally curved toward one another; except, the tip 39 of lower handle 32 is downwardly bent to enable a secure grip with the fingers 111 of the hand 110 of a user of pliers 10. The downwardly bent tip 39, more particularly, is a means for preventing the fingers 111 from slipping past tip 39 and off lower handle 32. The combined shape of the conventionally curved portion 52 and the downwardly bent tip 39 give lower handle 32 a profile shape (shown in FIG. 2) which is closely approximated by a cubic mathematical expression; the shape of lower handle 32 is, therefore, referred to as a "complex curve."

In contrast to lower handle 32, upper handle 22 is downwardly curved along its entire length for enabling a comfortable and otherwise secure fit in the palm 113 of the user's hand 110. The particular curve of the side profile of upper handle 22 is such that it matches the contour of the palm 113 when operatively gripped and is referred to as a "simple curve" since it can be represented by a second degree mathematical expression.

The jaws 21 and 31 are elongate, are also dissimilar relative to one another, and enable the function of pliers 10 in gripping fish. Upper jaw 31 curves downwardly along its entire length to the extent that the region near its tip 42 is approximately tangent to a circle concentric with pin 40. The side profile of lower jaw 21 (shown in FIG. 2) is curved slightly upwardly along its region 46 nearer pin 40, but curves downwardly in the region 41 near its tip 45. Thus, the profile of lower jaw 21 is S-shaped, and the profile of upper jaw 31 is C-shaped.

Figure 2:
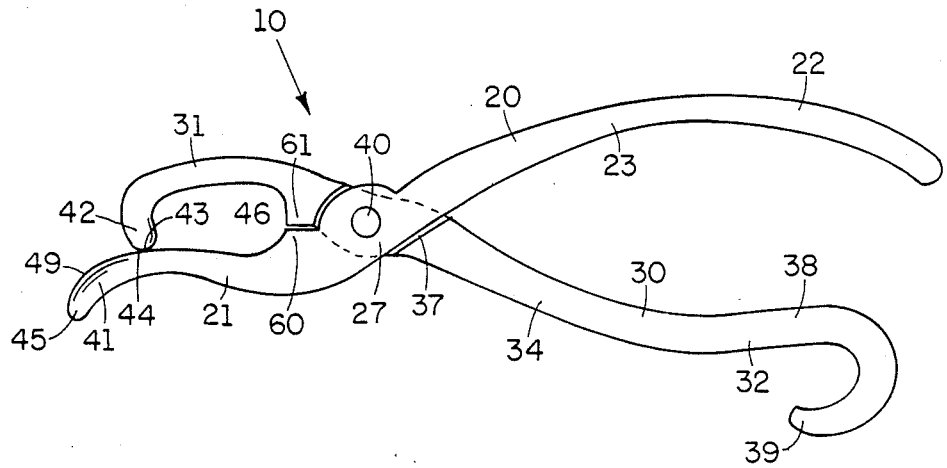
FIG. 2 is a side elevation view of the fish gripping apparatus 10 of the present invention, showing the left side of the gripping apparatus 10 shown in FIG. 1 with the jaws 21 and 31 closed to the fullest extent possible.

To grip the flesh 105 of a fish 100, lower jaw 21 is positioned beneath flesh 105 in a position central to mandible 101, upper jaw 31 is inserted within the mouth 102 of fish 100, and upper jaw 31 is then closed toward lower jaw 21 by manual operation of handles 22 and 32. As shown in FIG. 2, lower jaw 21 extends further from pin 40 than upper jaw 31 and is curved downwardly, away from upper jaw 30, in order to distribute the pressure of lower jaw 21 along the throat 103 of fish 100. The downwardly curved profile of jaw 21 near its tip 45 (as shown best in FIG. 2) serves to gradually reduce the pressure of lower jaw 21 on the throat 103 of fish 100, as opposed to an abrupt pressure reduction which would be caused by sharper curvature of lower jaw 21. The forward portion 49 of the engaging surface 43 of lower jaw 21 is also curved downwardly to each lateral side of the longitudinal center line 50 (shown in FIG. 3), making forward portion 49 generally convex. In contrast to the convexity of forward portion 49, the engaging surface 43 is curved only in its transverse direction to approximate the surface of a cylinder in the immediate proximity of tip 42. Lower jaw 21 also broadens in lateral dimension toward tip 45 and is finally rounded at tip 45 to give forward portion 49 the shape of an inverted spoon.

When flesh 105 is gripped by pliers 10, the extension of lower jaw 21 provides leverage against the lower surface of fish 100 (shown in FIG. 4). Such leverage enables a user of pliers 10 to tilt the mandible 101 of fish 100 in the direction of arrow 120 (as shown in FIG. 4). By thus tilting madible 101 in the direction of arrow 120, the weight of the rest of fish 100 tends to bias the mouth 102 of fish 100 in a wide open position. The relative orientations of upper jaw 31 and lower jaw 21, therefore, provide leverage for enabling access to within the mouth 102 of fish 100, thereby enabling removal of any fish hooks therefrom.

As is evident in FIG. 5, when jaws 21 and 31 are operatively closed to grip fish 100, the upper surface 43 of lower jaw 21 engages the outer surface of the flesh 105 central to mandible 101 without injuriously engaging mandible 101. When gripping fish 100, the lower surface 44 (indicated in FIG. 3) of the tip 42 of upper jaw 31 centrally engages flesh 105 inside the mouth 102 of fish 100 (i.e., posterior to teeth 104). Lower surface 44 and upper surface 43 are, therefore, referred to as "engaging surfaces" 44 and 43, respectively. The shapes of the engaging surfaces 44 and 43 cooperate to bias jaws 21 and 31 into a position central to mandible 101 upon closure of pliers 10 such that the support of lower jaw 21 is distributed laterally and longitudinally beneath the flesh 105 central to mandible 101 while upper jaw 31 causes compression in the very central part of flesh 105. Because immobilizing pressure points are typically located in the very center of mandible 101, engaging surfaces 44 and 43, therefore, enable positioning of mandible 101 in a position such that fish 100 tends to be temporarily paralyzed upon closure of jaws 21 and 31.

Figure 3:
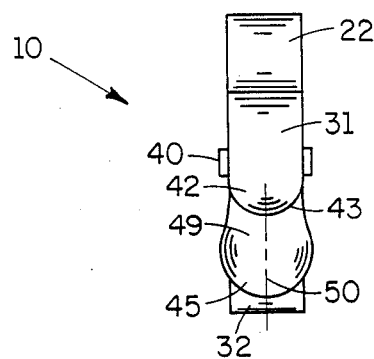
FIG. 3 is a front elevation view of the gripping apparatus 10 shown in FIG. 2.

Upon closure of jaws 21 and 31 to the extent possible, the tip 42 of upper jaw 31 is perpendicular to the upper surface 43 of lower jaw 21. Such perpendicular relationship between jaws 21 and 31 enables the tip 42 of upper jaw 31 to be inserted behind the teeth 104 and other substantially rigid parts of mandible 101. As shown in FIGS. 3 and 4, the engaging surface 44 of tip 42 is convex to prevent injury of fish 100 when jaws 21 and 31 are operatively closed. Upon such closure to grip fish 100, the relative shapes of the engaging surfaces 43 and 44 combine in a complimentary fashion to compress the flesh 105 central to mandible 101 without permanently injuring the same. Such compression of the flesh 105 central to mandible 101 not only provides a secure grip of fish 100, but also tends to paralyze fish 100. To safely facilitate such grip, the engaging surface 43 of lower jaw 21 has the shape of a cylinder positioned coaxially with longitudinal axis 50 of lower jaw 21 in the immediate proximity of tip 42, and the forward portion 49 of engaging surface 43 is convex and rounded. That shape of lower jaw 21 is generally advantageous over the lower jaws of the prior art because lower jaw 21 can engage the throat 103 of fish 100 between the opposite sides of mandible 101 without injuriously engaging those opposite sides of mandible 101. The tip 45 of lower jaw 21 is also flared outwardly relative to the rest of first member 20, as previously mentioned, for further enabling reception and gripping of flesh 105.

Such particularities of the upper and lower jaws 21 and 31, respectively, enhance the grip of pliers 10 on fish 100. The leverage enabled by the relative orientations of jaws 21 and 31 upon operative closure to grip fish 100, not only compresses flesh 105 central to mandible 101 in a manner which tends to paralyze fish 100, but also enables the user of pliers 10 to manually tilt fish 100 in the direction of arrow 120 such that the mouth 102 of fish 100 is propped open by the weight of the fish's body. Such manipulation of fish 100 props its mouth 102 wide open to enable removal of a hook from mouth 102.

Stops 60 and 61 are formed integral with members 20 and 30, respectively, to prevent jaws 21 and 31 from closing to an extent that the flesh 105 central to the mandible 101 of a fish 100 would not be injured during operation of pliers 10. This is particularly important in the sport fishing realm since an excited angler may not realize the strength with which he or she is gripping pliers 10 when a fish is being gripped thereby. Stops 60 and 61, nevertheless, do allow jaws 21 and 31 to be closed to an extent sufficient (to within approximately 0.5 mm of each other) to compress the flesh 105 central to the mandible 101 of fish 100 in order to cause temporary immobility of fish 100.

Thus, in operation, pliers 10 grip the mandible 101 of a fish 100 in a manner which mechanically simulates the traditional lower lip grip of fish 100 while minimizing injury to fish 100. Advantageous gripping of fish 100 is thereby enabled and bacterial infection of fish 100 is minimized.

Many other details, alterations, features, and advantages of the present invention will be obvious to one of ordinary skill in the art and are intended to fall within the spirit and scope of the appended claim's.

I claim:

1. Fish handling pliers for gripping the lower lip of a fish while minimizing injury to the fish, comprising:
a first jaw and a second jaw, each of said first jaw and said second jaw having an engaging surface for engaging the lower lip of a fish therebetween, the engaging surface of said second jaw being transversely convex and rounded near its tip and having the shape of an inverted spoon;

means for closing said first jaw toward said second jaw to grip the lower lip of a fish in a manner such that the flesh central to the mandible of said fish is compressed without injuring the opposite sides of the mandible, the end of said first jaw being perpendicularly positioned relative to the engaging surface of said second jaw; and means for limiting the closure of said first jaw towards said second jaw for minimizing the minimize injury to the flesh central to the mandible of said fish.

2. The fish handling pliers of claim 1 wherein:

said second jaw further has a proximal region nearer said pivot than said distal region; and said proximal region is curved toward the engaging surface of said first jaw such that said distal region and said proximal region give said second jaw an S-shaped profile.

3. Fish handling pliers for gripping the lower lip of a fish, comprising:

a first jaw and a second jaw, said first jaw being pivotally connected to said second jaw by a pivot, each of said first and second jaws having an engaging surface for engaging a fish;

said first jaw having a distal region which is curved towards the engaging surface of said second jaw and said distal region of said first jaw approaching said second jaw intermediate a distal region of said second jaw and said pivot; and said distal region of said second jaw curving away from the engaging surface of said first jaw to enable reception and support of the throat of said fish, the distal region being near a tip of said second jaw; and means for closing said first jaw toward said second jaw to grip the lower lip of said fish when the lower is positioned between the engaging surfaces of said first jaw and said second jaw.

* * * * *